United States Patent
Mujumdar et al.

(10) Patent No.: US 10,929,358 B2
(45) Date of Patent: *Feb. 23, 2021

(54) ACCESS CONTROL FOR NESTED DATA FIELDS

(71) Applicant: Microsoft Technology Licensing, LLC, Redmond, WA (US)

(72) Inventors: Prasad Mujumdar, Fremont, CA (US); Rakesh Khanduja, Bangalore (IN); Pratik Verma, Hopkins, MN (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 173 days.

This patent is subject to a terminal disclaimer.

(21) Appl. No.: 16/250,862

(22) Filed: Jan. 17, 2019

(65) Prior Publication Data

US 2019/0155794 A1 May 23, 2019

Related U.S. Application Data

(63) Continuation of application No. 15/249,286, filed on Aug. 26, 2016, now Pat. No. 10,185,726.

(51) Int. Cl.
*G06F 16/21* (2019.01)
*G06F 21/62* (2013.01)
*G06F 16/2452* (2019.01)

(52) U.S. Cl.
CPC ........ *G06F 16/211* (2019.01); *G06F 16/2452* (2019.01); *G06F 21/6209* (2013.01); *G06F 21/6218* (2013.01); *G06F 21/6227* (2013.01); *G06F 2221/2141* (2013.01)

(58) Field of Classification Search
CPC ............. G06F 16/2452; G06F 21/6227; G06F 21/6245
See application file for complete search history.

(56) References Cited

U.S. PATENT DOCUMENTS

| | | | |
|---|---|---|---|
| 6,463,470 | B1 | 10/2002 | Mohaban |
| 7,730,089 | B2 | 6/2010 | Campbell |
| 8,613,108 | B1 | 12/2013 | Aggarwal |
| 9,866,592 | B2 | 1/2018 | Arumugam et al. |
| 10,185,726 | B2 | 1/2019 | Mujumdar et al. |
| 2003/0018786 | A1 | 1/2003 | Lortz |
| 2003/0115322 | A1 | 6/2003 | Moriconi |
| 2004/0088560 | A1 | 5/2004 | Danks |

(Continued)

OTHER PUBLICATIONS

PCT International Preliminary Report on Patentability in International Applicaation No. PCT/US2017/048700, dated Feb. 26, 2019, 9 pages.

*Primary Examiner* — William Spieler
(74) *Attorney, Agent, or Firm* — Fiala & Weaver P.L.L.C.

(57) ABSTRACT

Systems, computer program products and methods implementing access control for compound structures including subfields are described. A policy system receives a database schema and a data access policy. The database schema defines multiple subfields of a data column. The policy includes one or more rules limiting access to the subfields. A policy analyzer of the policy system creates an access control metadata that stores correspondence between the subfields and the rules. The policy analyzer represents the subfields in the access control metadata using relations between subfields and other components of the database. The policy analyzer provides the access control metadata to a policy enforcer for enforcing the policy on the subfields.

20 Claims, 7 Drawing Sheets

(56) References Cited

U.S. PATENT DOCUMENTS

| | | |
|---|---|---|
| 2005/0021978 A1 | 1/2005 | Bhat |
| 2007/0124797 A1 | 5/2007 | Gupta |
| 2011/0209194 A1 | 8/2011 | Kennedy |
| 2012/0198467 A1 | 8/2012 | Jackson |
| 2014/0012833 A1 | 1/2014 | Humprecht et al. |
| 2014/0090085 A1 | 3/2014 | Mattsson et al. |
| 2014/0365527 A1 | 12/2014 | Fuchs et al. |

600

Intercepting a query submitted by a user device to a database, the query including a statement for accessing a data column of a table in the database
602

Determining that the data column has a data type that defines a plurality of subfields of the column
604

Obtaining, from access control metadata, an access restriction on a subfield of the column
606

Modifying the query, including replacing a reference of the data column in the query with a respective reference of each of the plurality of subfields according to the access restriction
608

Submitting the modified query to the database
610

FIG. 6

ACCESS CONTROL FOR NESTED DATA FIELDS

CROSS-REFERENCE TO RELATED APPLICATIONS

This application is a continuation application of and claims priority to U.S. application Ser. No. 15/249,286, filed on Aug. 26, 2016.

BACKGROUND

Modern databases can store data in compound structures. For example, in addition to storing data as integers, float point numbers, characters or strings, a database can store data in compound structures including arrays, maps or user-defined object types. A relational database stores data in columns and rows. A column in a table can have a data type that corresponds to a compound structure. An application program that reads data from the table can retrieve, as a single data item, an object that includes multiple subfields, e.g., subfields of integers, float point numbers, nested objects and so on.

SUMMARY

In general, this specification relates to database security and access control.

Systems, computer program products and methods implementing access control for compound structures including subfields are described. In some implementations, a policy system receives a database schema and one or more data access policies. The database schema defines multiple subfields of a data column. A data access policy includes one or more rules limiting access to the subfields. A schema analyzer of the policy system creates access control metadata that stores, in a compact format, correspondence between the subfields and the rules. The policy analyzer represents the subfields in the access control metadata using an access path that indicates relations between the subfields and other components of the database. The policy analyzer provides the access control metadata to a policy enforcer for enforcing the policy on the subfields.

In some implementations, a policy system intercepts a query submitted from a user device to a database. A policy enforcer of the policy system determines that the query accesses a data column that has one or more subfields. The policy enforcer determines that a policy including one or more rules limits accesses to the one or more subfields. In response, the policy enforcer modifies the query. For example, the policy enforcer can replace a term referencing the data column with one or more terms and conditions referencing the subfields. The policy enforcer than submits the modified query to the database.

Particular embodiments of the subject matter described in this specification can be implemented to realize one or more of the following example advantages. Conventionally, access control on databases can have a granularity level at a data column of a table. Finer-grained access control on subfields of data columns can be done, for example, using database triggers or application logic for manipulating result sets of a query. Either approach may lead to non-portable data access control. The techniques disclosed in this specification provides a transparent middle layer between an application and a database, and implements data access control in the middle layer. The disclosed implementations reduce or avoid the needs of in-database programming (e.g., of stored procedures, triggers, or other mechanisms) for data access control. The disclosed implementations reduce or avoid the needs of in-application programming for enforcing access control, thus separating data access control policies from application logic. The disclosed implementations allows changing access rules on the file, without changing code of the database or the application. Accordingly, compared to conventional technologies, the techniques disclosed in this specification provide a modular, portable and dynamic way of data access control.

The details of one or more embodiments of the subject matter of this specification are set forth in the accompanying drawings and the description below. Other features, aspects and advantages of the subject matter will become apparent from the description, the drawings and the claims.

BRIEF DESCRIPTION OF THE DRAWINGS

FIG. 6 is a flowchart of an example method of enforcing data access policies on subfields of a data column.

Like reference numbers and designations in the various drawings indicate like elements.

DETAILED DESCRIPTION

Some data stored in a database can have an inherent structure. A database can store the structured data as a blob or, as described in more details in various examples below, as an object having components designated as subfields. For example, a database can store a "user_profiles" table storing names and addresses of users. The addresses can be stored in a data column of the table, the data column being named "address." An address of a user may have a structure including, among other components, a street name and number, a city, and a postal code. The database can store the address as a blob, e.g., in a data column having a binary large object (BLOB) data type or string datatype, or in a data column having a structured data type having a first subfield "street" representing the street name and number, a second subfield "city" representing the city, and a third subfield "zip" representing the postal code.

The database can store sensitive data, such as personally identifiable data. A data access policy, or simply referred to as a policy, can specify one or more rules that define accessing privileges of an application program one certain pieces of the data. Each rule specifies whether one or more tables, one or more columns, one or more subfields, or any combination of the above, can be fully accessed by an application, partially accessed by an application, or prevented from being accessed by an application. For example, a policy can specify that the "city" subfield of an address of a user is generally accessible, that the "zip" subfield is partially accessible, where the last four digits are masked, and that the "street" subfield is generally inaccessible.

A policy system implements one or more such policies. The policy system acts as an intermediary between a user device issuing a query and a database system executing the query. The policy system can modify the query to prevent the query from accessing certain database tables, columns, or in particular, subfields. The policy system can inject additional functions into the query. The database then executes the modified query. The policy system can thus control access to the data by limiting what queries are received by the database, regardless of what queries are submitted by the user device. A query received by the policy system has a first format as provided by the user device. The policy system converts the query to a second format that the policy system can use to identify subfield policies. The policy system then applies the subfield policies by modifying the query. The policy system converts the modified query to a third format understandable by the database. The policy system then submits the modified query to the database. Additional details on implementing data access control by the policy system are described below.

Figure 1:
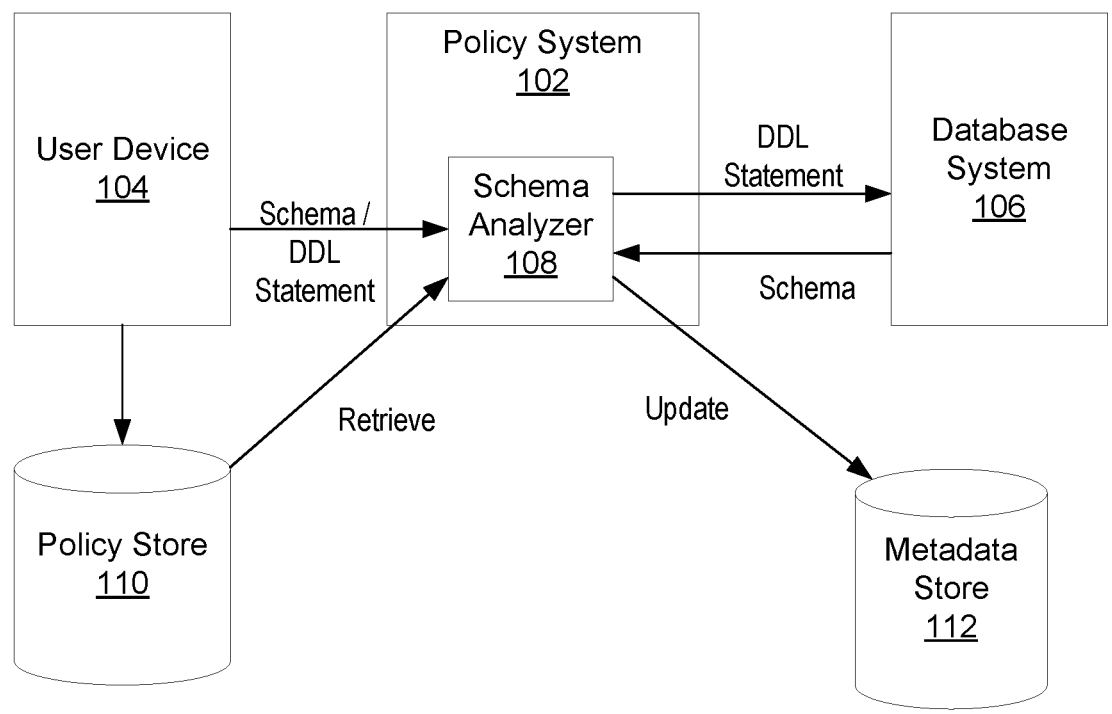
FIG. 1 is a block diagram illustrating example data access control techniques of generating access control metadata from database schemas.

FIG. 1 is a block diagram illustrating example data access control techniques of generating access control metadata from database schemas. A policy system 102 is one or more computers that implement the data access control techniques. The policy system 102 receives a first input that includes a database schema and a second input that includes one or more policies, and generates access control metadata. A database schema can include a logical structure of a database, e.g., tables, columns and subfields. A policy can include rules on limiting access to specific tables, columns and subfields. The access control metadata can include structured data, in a compact but quickly accessible format, that the policy system 102 can use for modifying queries.

The policy system 102 receives the database schema from a user device 104 or from a database system 106. The policy system 102 receives the database schema from the user device 104 upon receiving, for example, a data definition language (DDL) statement for creating a table or altering a table. The DDL statement can be a structured query language (SQL) "CREATE TABLE" or "ALTER TABLE" statement that defines columns and subfields of a table. The policy system 102 can intercept the DDL statement from the user device 104, determine the schema from the DDL statement, and then submit the DDL statement to the database system 106.

Alternatively or additionally, the policy system 102 can receive the database schema from the database system 106 using a database statement for describing a schema, for example, a SQL "DESCRIBE TABLE" statement. The policy system 102 issues the database statement to database system 106, and receive the database schema, e.g., definitions of columns and subfields in return.

In the examples shown, the user device 104 can be one or more computers configured to execute an application program of a user or to receive an input from a user for accessing a database. For simplicity, only one user device 104 is shown. In various implementations, the policy system 102 can receive the data schema, queries or both from multiple user devices 104. Each schema or query can be associated with an identifier or a certificate identifying a user, application, or user device 104 providing the schema or query. For example, the identifier or certificate can be associated with a session in which the policy system 102 receives the schema or query. The policy system 102 can determine which policy to apply to the schema or query based on the identifier or certificate. The database system 106 can be one or more computers implementing one or more databases. In the examples shown, the databases are SQL-based relational databases. In various implementations, file systems or databases having other paradigms can be used.

The policy system 102 includes a schema analyzer 108. The schema analyzer 108 is a component of the policy system 102 configured to generate access control metadata on individual components, also referred to as data fields, represented in the database schema. For example, by parsing the database schema, the schema analyzer 108 can determine tables, columns, and subfields, and map one or more data access policies to the individual components to generate the access control metadata.

The schema analyzer 108 can obtain the one or more policies from a policy store 110. In various implementations, the policy store 110 can be a component of the policy system 102 or, as shown in FIG. 1, a database system separate from, and coupled to, the policy system 102. The policy store 110 stores one or more policies. Each policy can include a collection of one or more rules. Each rule can specify a domain where the rule is effective, a data field on which the rule applies, an action on the data field that the rule applies, and an effect of the rule. For example, a rule can specify whether a domain that the rule is applicable is global or local to a particular workspace. A rule can specify whether a data field on which the rule applies is a table, column or subfield or any combination of the above. A rule can specify whether an action that the rule is limiting is read, write, use, command or execute. A rule can specify whether an effect on the action is allow, deny, or mask. The user device 104 can edit a policy stored in policy store 110, e.g., by using a web-based or command-line-based user interface.

From the schema and the policy, the schema analyzer 108 generates the access control metadata. The access control metadata can include a representation of an access path, or simply referred to as a path, to the data field identified in a rule. The access control metadata can include action and effect associated with the data field. The path can include numeric values representing relations between a database, a schema, a column, and a subfield. For example, when the data field specified in a rule is a subfield F in a column C of a table T having schema S in database D, the path can have a format that specifies the database, the schema, the table, the column, and then the subfield F, for example, in the form of D:S:T:C:F. The schema analyzer 108 can use the access path with a sequence of numeric values, instead of names, as an identifier of a data field.

The schema analyzer 108 can determine the access path from the schema and database. Determining the access path can include determining each respective value of the D, S, T, C, F. Each value can represent a relative position of a corresponding data field in a corresponding level. For example, for a particular subfield having a path D:S:T:C:F, the value of F can represent a relative position of that subfield among subfields of a data column. Additional details on content of the access control metadata are described below in reference to FIGS. 3A and 3B. The schema analyzer 108 can associate the access path with the action and effect, and include the association in the access control metadata.

The schema analyzer 108 stores the access control metadata in a metadata store 112. In various implementations, the metadata store 112 can be a component of the policy system 102 or, as shown in FIG. 1, a database system separate from, and coupled to, the policy system 102. The schema analyzer 108 can store the access control metadata in an access permissions table keyed on the path. For example, the access permissions table can designate the access path as a primary key. The policy system 102 can then modify database queries according the access control metadata at runtime, when an application issues queries to the database 106. Additional details on modifying the database queries are described below in reference to FIG. 2.

As an example, the schema analyzer 108 can parse a DDL statement received from the user device 104. The DDL statement can have content as shown in Listing 1 below. The schema analyzer 108 determines a schema in a database in the database system 106 based on the content.

---
Listing 1
---

```
CREATE TYPE address_type (
    street TEXT,
    city TEXT,
    zip TEXT
);
CREATE TABLE user_profiles (
    id INT PRIMARY KEY,
    name TEXT,
    address MAP<TEXT, FROZEN<address_type>>
);
```

---

The schema analyzer 108 can parse the statement and determine that in a database currently being used, a table "user_profiles" can have columns, e.g., id, name and address. The data column "address" has a data type MAP, which defines subfields in a user-defined type "address type" including street, city and zip. The schema analyzer 108 can generate a path to each data field, including each subfield. For a subfield, the schema analyzer 108 generates a path that includes a first identifier corresponding to a position of the database, a second identifier corresponding to a position of the schema, a third identifier corresponding to a position of the table "user_profiles," a forth identifier corresponding to a position of the column "address" and a fifth identifier corresponding to a position of the subfield. The schema analyzer 108 then stores the paths of the data fields, in association with rules of access, in the metadata store 112.

Figure 2:
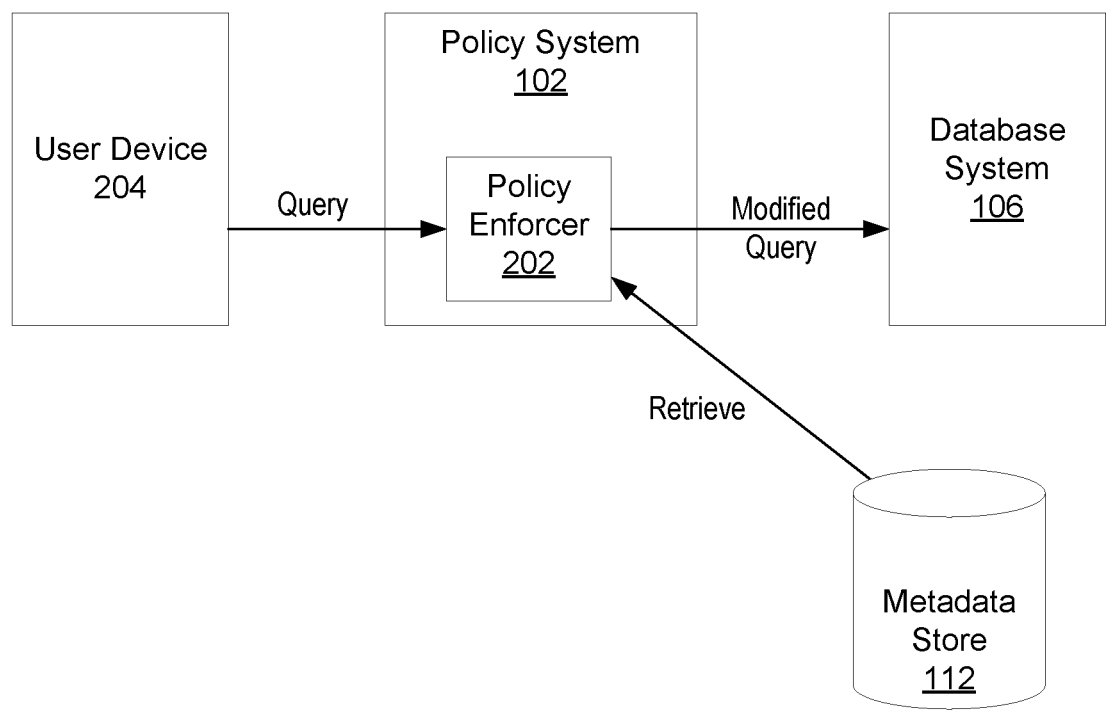
FIG. 2 is a block diagram illustrating example data access control techniques of intercepting and modifying queries based on access control metadata.

FIG. 2 is a block diagram illustrating example data access control techniques of intercepting and modifying queries based on access control metadata. A policy system 102 enforces a data access policy by modifying a query based on the access control metadata.

The policy system 102 includes a policy enforcer 202. The policy enforcer 202 is a component of the policy system 102 configured to enforce data access policies during runtime, when an application, as a client of a database system 106, issues one or more queries to access data stored in the database system 106. For illustration purposes, the queries and other database statements described in this specification are SQL queries and statements. In various implementations, other database language, e.g., object-oriented query language, can be used.

The policy system 102 receives a query issued by an application executing on a user device 204. The user device 204 can be the same as the user device 104 of FIG. 1, or a different user device. The query can include a statement that directly accesses a subfield of a data column, or indirectly accesses a subfield by accessing a group of data fields that include a subfield of a data column. In either case, the policy enforcer 202 can parse the query, and determine whether a portion of the query needs to be modified.

For example, the policy enforcer 202 can receive a query that accesses a data column as a whole, instead of accessing subfields of the data column directly. An example is shown below in Listing 2 below.

---
Listing 2
---

```
SELECT id, address FROM user_profiles;
```

---

The policy enforcer 202 parses the query and determine that a term, e.g., "address" in the query references a data column having a data type that indicates subfields. The policy enforcer 202 retrieves, from a metadata store 112, access control metadata. The policy enforcer 202 performs a lookup in the metadata store 112 using information about the query. In various implementations, the information can include access paths of data fields explicitly or implicitly referenced in the query. The policy enforcer 202 can determine, from rules that correspond to the information about the query, that one or more rules limit access to at least one subfield of a referenced column.

For example, from the rules associate with a path that corresponds to the database, table and column, the policy enforcer 202 can identify a first rule that specifies that applications are generally allowed to access data in a data column, e.g., "address" that has multiple subfields. The policy enforcer 202 can identify a second rule that is more specific than the first rule. The second rule is directed to a subfield, e.g., "zip" of the data column. The second rule specifies that applications can access masked content of the subfield, where a portion of the content is to be redacted. For example, the second rule can specify that the last four digits of the "zip" subfield shall be masked with a masking string (e.g., "XXXX"). The masking string can be specified in the second rule.

The policy enforcer 202 can determine that the more specific rule, e.g., the second rule limiting data access further than the more generic rule, e.g., the first rule. The policy enforcer 202 then determines to enforce the more specific rule over the more generic rule. The policy enforcer 202 can modify the query, including expanding the term that is references the data column as a whole into one or more terms reference specific subfields of the data column. For example, the policy enforcer 202 can modify the query of Listing 2 by expanding the SELECT statement of Listing 2 into a new SELECT statement, as shown in Listing 3 below.

---
Listing 3
---

```
SELECT id, array(named_struct(
    "street", address.street,
    "city", address.city,
    "zip", regexp_replace(zip, substr(zip, 1), 'XXXX')))
FROM user_profiles t
LATERAL VIEW EXPLODE(address.zip);
```

---

The policy enforcer 202 determines that a column name, e.g., address, corresponds to a column having subfields. In response, the policy enforcer 202 expands the column name into an array of the subfields, in this example, street, city and zip. In addition, the policy enforcer 202 determines, from access control metadata retrieved from metadata store 112, that one or more subfields are subject to access restrictions. For example, the policy enforcer 202 can determine that a particular subfield, e.g., zip, is subject to masking, where the last four digits are to be masked by a masking string (e.g., "XXXX"). In response, the policy enforcer 202 can inject an operation into the expanded column names to reflect the access restriction. In this example, the policy enforcer 202 injects a regular expression operation "regexp_replace" to replace a substring of the subfield "zip" with the masking string, starting from position 1, which is the second character.

The example in Listing 3 uses "regexp_replace" as an example of the operations for masking a subfield. The policy enforcer 202 can inject other types of operations in a query. Thus, various operations of the queries can be defined by a user, similar to how policies are defined. Changing query operations by injecting user-defined operations improves upon conventional technologies of defining logic in application code or in SQL statement. This is because by allowing operations of the queries to be defined separately, and injecting the operations into the queries at runtime, the policy system 102 supports a paradigm where logic of an application can change on the fly. Accordingly, the change can be separated from developers of the application or database developers. The logic injected can include, in addition to access control (e.g., masking) as described above, data conversion, conditional processing, data range limitation, among others.

Upon modifying the query by expanding references to columns into references to subfields, and by injecting operations including masking and other operations as described above, the policy enforcer 202 can provide the modified query to the database system 106. The database system 106 then processes and executes the modified query, rather than the query originally submitted by the user device 204. The database system 106 can provide a result of executing the query to the user device 204, directly, through the policy system 102, or through another system that acts as middleware between the user device 204 and the database system 106. The result includes a result set of the query, e.g., when the query includes a SELECT statement retrieving data, or a status code of executing the query, e.g., when the query includes an INSERT statement inserting data. The modification to the query performed by the policy enforcer 202 can be transparent to the user device 204.

Figure 3A:
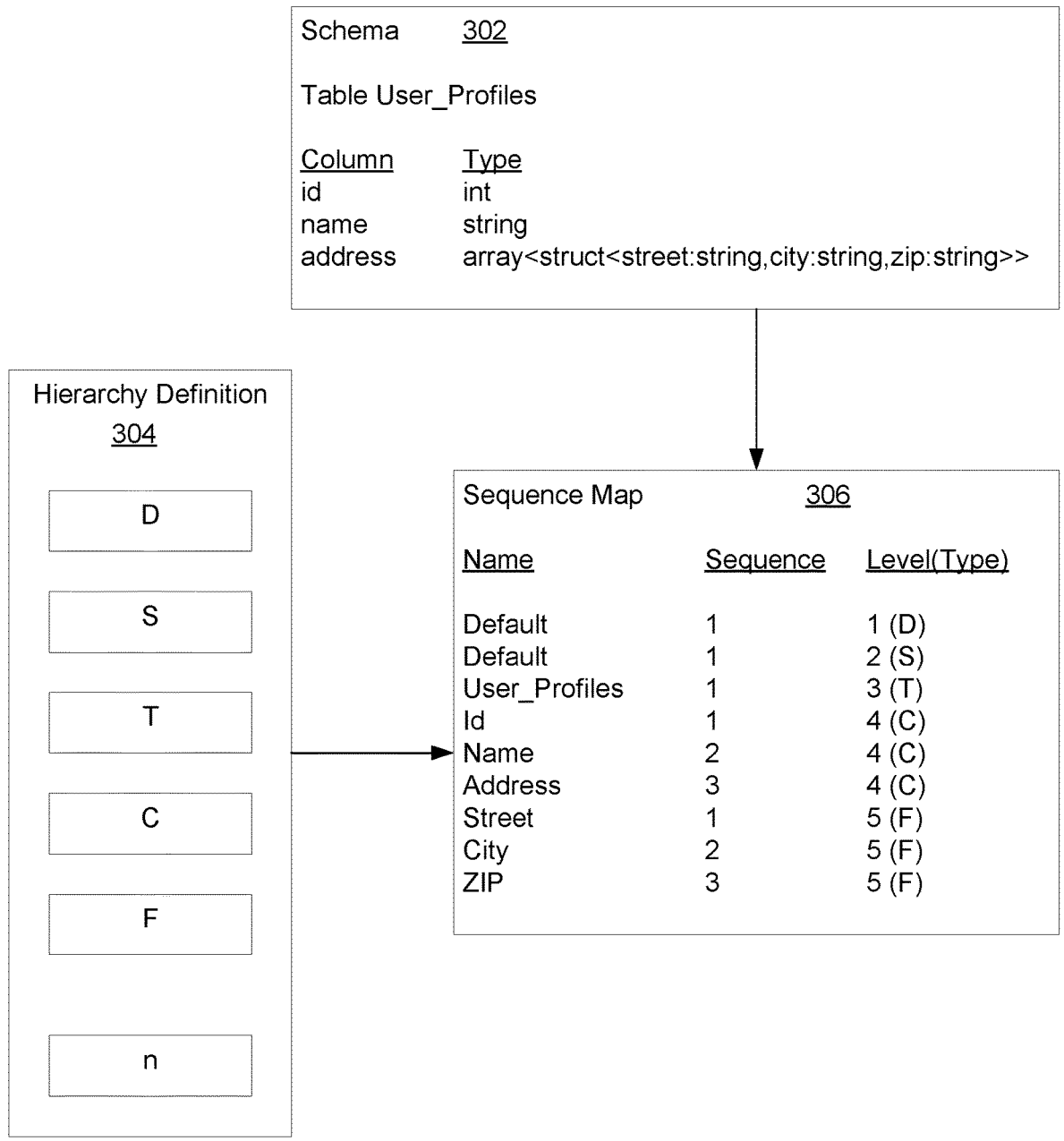
FIGS. 3A and 3B illustrate example techniques of generating access control metadata.
Figure 3B:
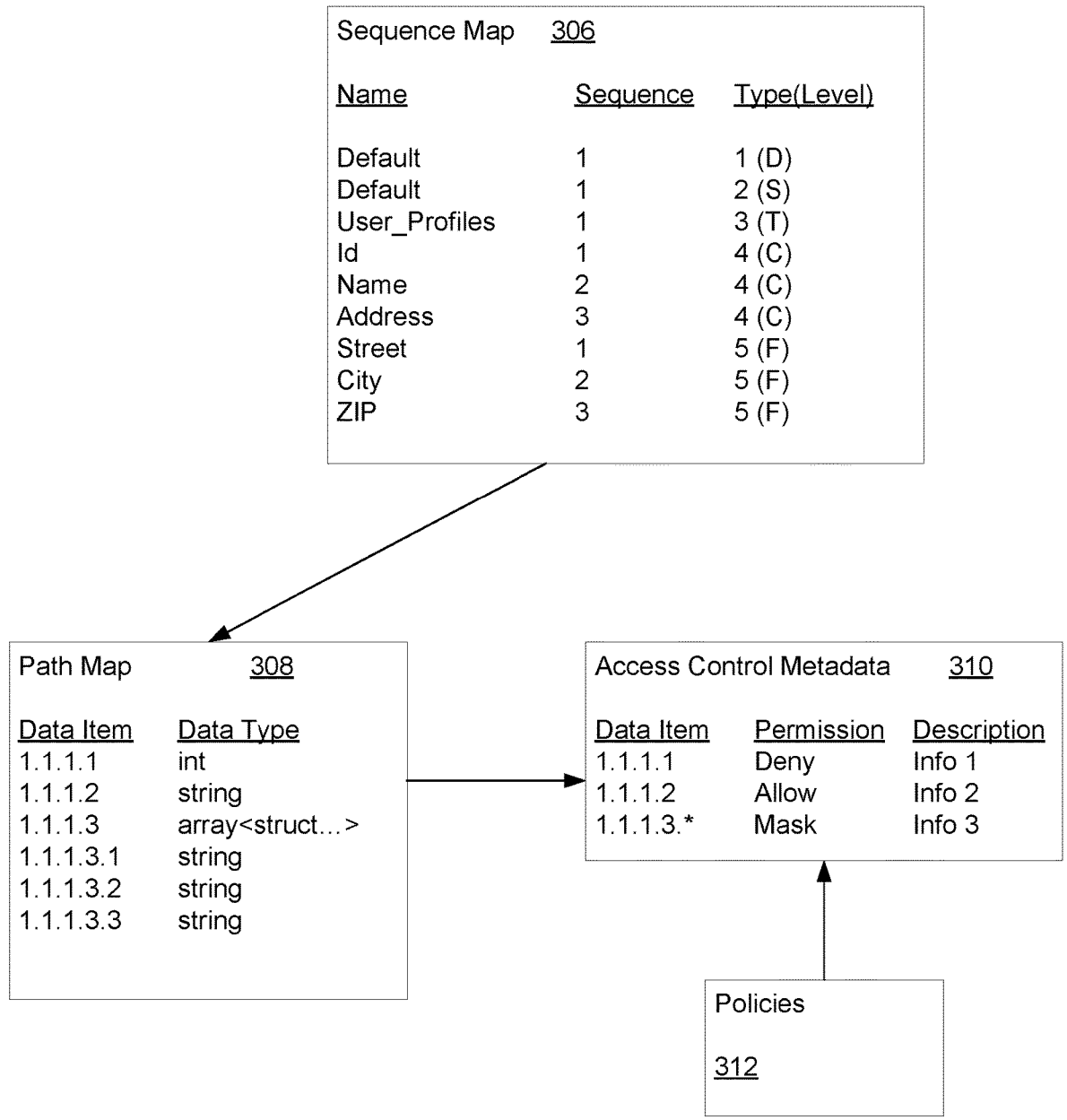

FIGS. 3A and 3B illustrate example techniques of generating access control metadata. FIG. 3A illustrates an example first stage of generating access control metadata. A schema analyzer, e.g., the schema analyzer 108 of FIG. 1, obtains a schema 302. The schema 302 can include a definition of a database table, including user-defined types used in the database table. The schema analyzer can obtain the schema 302, for example, by parsing a DDL statement for creating the table or by issuing a "DESCRIBE TABLE" or similar statement to a database system. In the example shown, the schema 302 corresponds to the "user_profiles" table described above.

The schema analyzer obtains a hierarchy definition 304. The hierarchy definition 304 is a hierarchical data structure defining hierarchies in a database system. The hierarchy definition 304 can specify a D:S:T:C:F format, indicating that that schema analyzer shall describe access paths to data fields in the order of database level, schema level, table level, column level, and subfield level. The order shown, from the top down as D:S:T:C:F, is an example. In various implementations, other order schemes, e.g., from the bottom up as F:C:T:S:D, is possible. The hierarchy definition 304 can correspond to a format of an access path leading to a data field. A data field can be a unit of data to which an access rule may apply. A data field can be at any level. For example, each of a database, a schema, a table, a data column, a subfield can be a data field. The hierarchy definition 304 can define paths of nested subfields, where a subfield of a data column is a compound object having one or more deeper-level subfields, and so on. The hierarchy definition 304 can represent arbitrary number of levels of subfields, e.g., to the n-th level, as shown in FIG. 3A.

In some implementations, the schema analyzer obtains the hierarchy definition 304 from pre-stored or hard-coded data definitions. In some implementations, the schema analyzer can obtain the hierarchy definition 304 by parsing one or more type definitions in the schema, and identify compound objects from the type definitions. For example, the schema analyzer can recursively parse type-definition statements such as the "CREATE TYPE" statements as shown in Listing 1 to determine whether a data type is a compound type having one or more levels of subfields.

The schema analyzer generates a sequence map 306 from the schema 302 and the hierarchy definition 304. The sequence map 306 can store an identifier, e.g., a name, of a data field in association with the sequence identifier and level identifier of that data field. A level identifier identifies a level in the hierarchy definition 304 of a corresponding data field. A sequence identifier is a numerical value that identifies a position of a corresponding data field among data fields at the same level. The position, e.g., 1, 2, 3, 4 . . . can be the position of an item at a specific level as defined in the database system, e.g., the first database in the database system or second database in the database system. The position can be the position of an item at a specific level as defined in the schema 302. For example, the schema 302 defines three columns, id, name and address. The respective position of the columns can be 1, 2 and 3, respectively.

For example, a database table, e.g., "user_profiles" can be a first table defined in a schema, e.g., the schema 302 in a database, e.g., the database system 106 of FIG. 1. The database can be a first database in a database system. Accordingly, the database has a sequence identifier 1 indicating that the database is a first database, a level identifier 1, or D, indicating that the database is at the first level, e.g., the database level D, of the hierarchy definition 304. A data column, e.g., "address" as shown in the schema 302 can be the third column of the table. Accordingly, in the sequence map 306, the data column "address" is represented using a name "address" of the data column in association with sequence identifier 3 indicating the "third column." The representation can be associated with level identifier 4 (or C) indicating that data field "address" is at the fourth level (e.g., the column level C) of the hierarchy definition 304. Accordingly, a data field corresponding to the column "address" can be represented by an access path 1.1.1.3, where the fourth number is the number 3 indicating the position. The schema analyzer can represent the subfields, e.g., street, city and zip, in sequence map 306 in a similar manner. Accordingly, the access paths to the subfields street, city and zip are 1.1.1.3.1, 1.1.1.3.2 and 1.1.1.3.3, respectively. The schema analyzer can store the sequence map 306 in various data structures, including, for example, as a SQL database table that is accessible only with certain privileges, e.g., the privileges of a policy system.

FIG. 3B illustrates an example second stage of generating access control metadata. The schema analyzer generates a path map 308 from the sequence map 306. The path map 308 is a data structure in which a data field is represented by a path for accessing the data field. A path to access a data field X is a sequence of identifiers that leads, from a highest level data field containing data field X, through one or more intermediate data fields containing data field X, to data field X. For example, a data field "zip" in the user_profiles table described above is represented in a database (e.g., database system 106 of FIG. 1), represented in a schema (e.g., schema 302), represented in a table (e.g., "user profiles"), represented in a data column (e.g., the third column "address"), and is a particular subfield (in this case, the third subfield) of the data column. Accordingly, the subfield "zip" can be represented by path using numerical values 1.1.1.3.3, where each component of the path represents a sequence identifier at the database level, schema level, table level, column level, and subfield level, respectively. The schema analyzer can store the path as an identifier of the data field in the path map 308 in association with a respective data type. The schema analyzer can store the path map 308 in various data structures, including, for example, as a SQL database table that is accessible only with certain privileges, e.g., the privileges of a policy system.

The schema analyzer generates access control metadata 310 from the path map 308 and policies 312. The access control metadata 310 can include paths for accessing the data fields, and corresponding permissions for accessing each data field. The permissions can include a combination of effect (e.g., allow, deny or mask) and action (e.g., read, write, use, command, or execute) as described above. For simplicity, only the effect portion of the permissions are shown in FIG. 3B. The schema analyzer can determine the permissions by parsing the rules of the policies 312, and mapping the rules and the paths.

Some rules may be applicable to multiple data fields. For example, a particular rule may specify that all subfields that are in a particular column shall be subject to a given permission, e.g., masking for read operations. The schema analyzer can represent the scope with this particular rule using wild cards, e.g., "*" or "?" as used in regular expressions. Likewise, the schema analyzer can translate conditions specified in the rule into expressions or procedures that are injectable into a database query, e.g., as SQL expressions, operators, or triggers. Unlike pre-programmed SQL expressions, operators, or triggers, these SQL expressions, operators, or triggers can be generated at runtime when the database and application logic have already been created. These conditions can change when the policy changes, even at runtime. Thus, the operations of the schema analyzer improve upon conventional technology at least by the feature of dynamically generating SQL statements at runtime. The schema analyzer can store the access control metadata 310 in various data structures, including, for example, as a SQL database table, in a metadata store, e.g., the metadata store 112 of FIG. 1.

At runtime, a policy enforcer, e.g., the policy enforcer 202 of FIG. 2, intercepts a query. The policy enforcer can parse the query and translate queried data fields into identifiers including access paths of the data fields. The policy enforcer then performs a lookup in the access control metadata 310. Upon identifying a match, the policy enforcer can modify the query by replacing a corresponding data field with a series of subfields, and limiting access to each of the subfields. The match can be a literal match where two paths are identical to one another, or a partial match, e.g., based on regular expressions, wild cards, and database query expansion rules.

The operations of the schema analyzer and policy enforcer are described in the context of data fields in a relational database as an example. In various implementations, the operations are applicable to any database system or file system that has a hierarchical structure, where data fields have a parent-child relationship and are stored in sequence. Using access paths, e.g., numerical values that are arranged according to an order of levels in a hierarchy and that indicate positions in each level, the schema analyzer and policy enforcer can facilitate efficient rule storage and mapping, and expedite query expansion at runtime.

Figure 4:
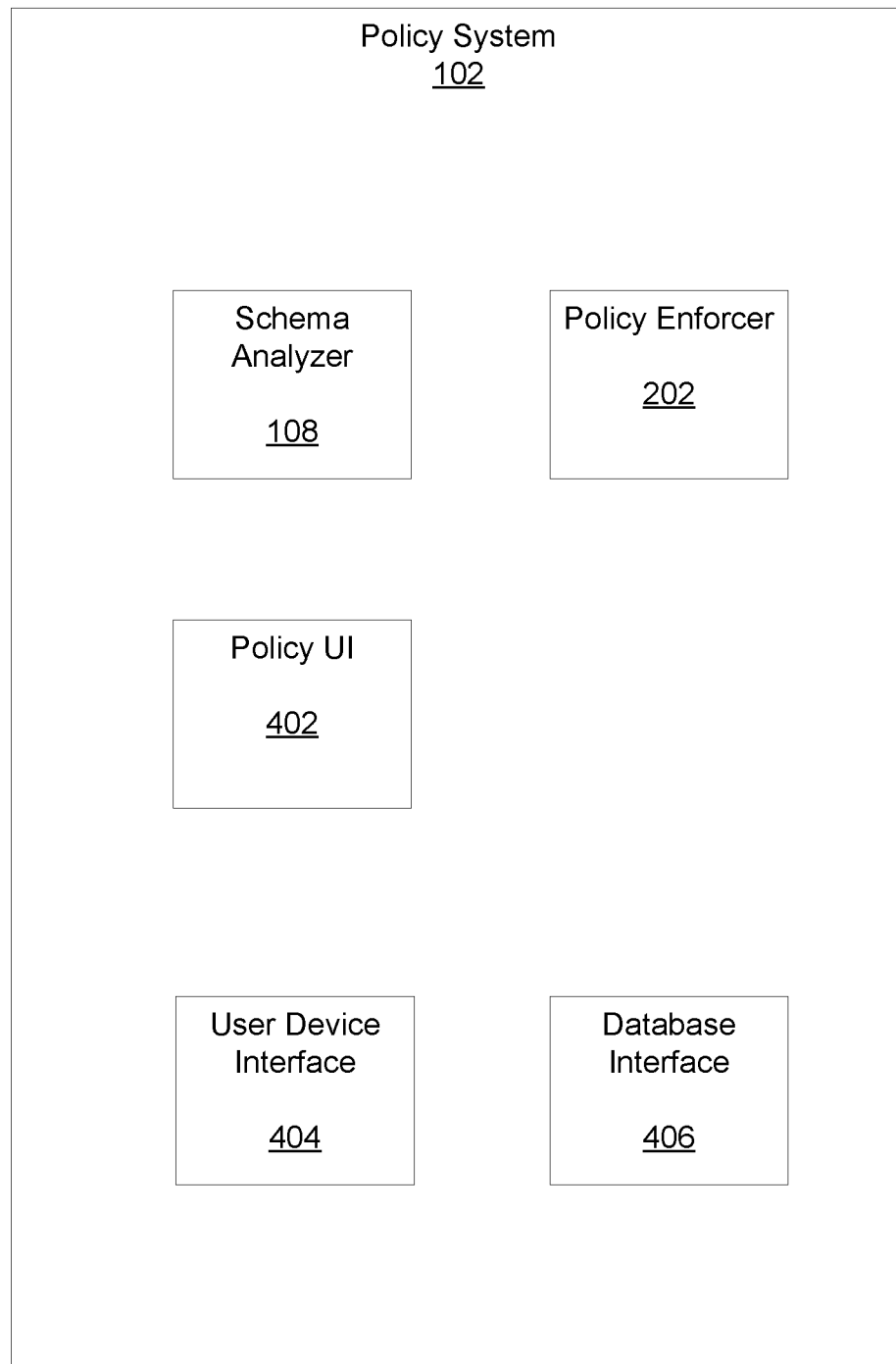
FIG. 4 is a block diagram illustrating components of an example policy system.

FIG. 4 is a block diagram illustrating components of an example policy system 102. Each component of the policy system can be implemented by one or more computers. The policy system 102 includes schema analyzer 108 and policy enforcer 202, the operations of which are described above in reference to FIGS. 1 and 2, respectively.

The policy system 102 can include a policy user interface 402. The policy user interface 402 is a component of the policy system 102 configured to receive input for creating a policy including one or more rules. The policy user interface 402 can have a first interface item for specifying a respective data field for each rule. The first interface item can obtain a path to the data field by receiving a user input specifying the path by name. The path can include a database identifier, a schema identifier, a table identifier, a column identifier, a subfield identifier, one or more wildcards, or any combination of the above. For example, the first interface item can receive an input specifying that rule R is applicable to a data field at path "mydb.myschema.userprofiles.address.zip." The policy system 102 can then translate the path into the access path format as described above in reference to FIGS. 3A and 3B.

The policy user interface 402 can have a second interface item for specifying an action, e.g., read, write, use, command or execute. For example, the second interface item can receive an input specifying that rule R applies to a "read" action. The policy user interface 402 can have a third interface item for specifying an effect, e.g., allow, deny or mask. For example, the third interface item can receive an input specifying that rule R masks a portion of the data field. The policy user interface 402 can have a forth interface item for specifying a role for which the rule applies. For example, the policy user interface 402 can have a menu for specifying that rule R applies to an owner of the data field, a designated group of users, or all users.

The policy system 102 can include a user device interface 404. The user device interface 404 is a component of the policy system 102 configured to intercept queries sent from a user device to a database. In some implementations, the user device interface 404 is configured to submit a query result back to the user device. The policy system 102 can include a database interface 406. The database interface 406 is a component of the policy system 102 configured to request a schema from a database, submit a modified query to a database, and optionally, receive a result of executing the query from the database. In various implementations, the policy system 102 can include, or be coupled to, a policy store for policies and a metadata store for access control metadata. The policy store and metadata store can be implemented on a SQL database or on a file system.

Figure 5:
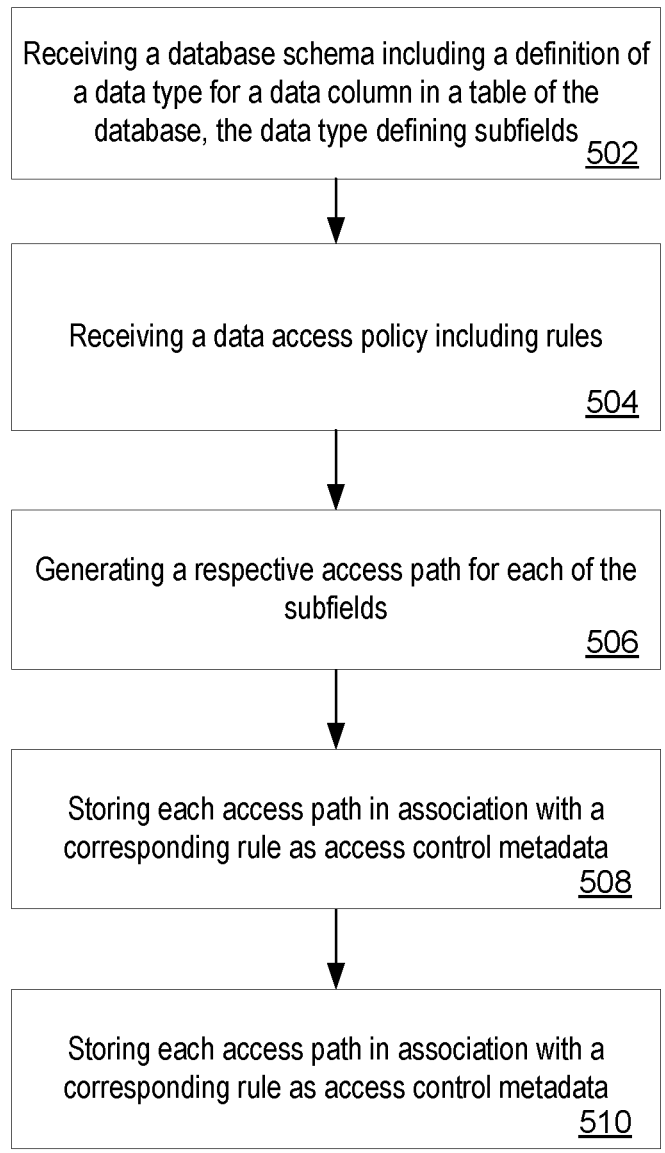
FIG. 5 is a flowchart of an example method of generating access control metadata from database schemas.

FIG. 5 is a flowchart of an example method 500 of generating access control metadata from database schemas. The method 500 can be performed by a policy system including a schema analyzer, e.g., the policy system 102 of FIG. 1.

The policy system receives (502) a database schema. The database schema includes a definition of a data type for a data column in a table of the database. The data type defines one or more subfields of the data column. Receiving the database schema can include receiving a DDL statement of creating or altering the table from a user device. Receiving the database schema can include receiving a database or table description from the database.

The policy system receives (504) a data access policy including multiple rules. Each rule can specify a respective access limitation on a subfield of the subfields. Each of the access limitations includes allowing an action on the respective subfield, denying an action on the respective subfield, or masking at least a portion of the respective subfield. The action can include read, write or execute, among others.

The policy system generates (506) a respective access path for each of the subfields. Each access path represents hierarchical relations between the database, the schema, the table, the data column, and a respective subfield. Generating the respective access path for each of the subfields can include, first, generating a sequence map storing identifiers of levels of the hierarchical relations and a respective position of each of the subfields in a level. The policy system can then generate the respective access path to the subfield by concatenating a series of positions of the database, schema, table, column and subfield. The identifiers of levels include a first identifier corresponding to a database level, a second identifier corresponding to a schema level, a third identifier corresponding to a table level, a fourth identifier corresponding to a column level, and a fifth identifier corresponding to a subfield level. Each identifier has a respective value indicating a respective position. For example, the access path "1.1.1.3.2" includes identifiers 1, 1, 1, 3 and 2, indicating, respectively, a position of a database in a database system, e.g., 1; a position of a schema in the database, e.g., 1; a position of a table in the schema, e.g., 1; a position of a column in the table, e.g., 3; and a position of a subfield in the column, e.g., 2. In the example table "user_profiles" as described above, access path "1.1.1.3.2" uniquely identifies the data field "city" in the "address" data column.

In some implementations, the access path to the subfield includes a concatenation of (1) at least one of the first, second, third, and fourth identifiers; and (2) one or more wildcards representing one or more of the subfields in the column. For example, an access path "1.1.1.3.*" identifies subfields street, city, and zip of the "address" data column in the table user_profiles. An access path "1.1.1.*.3" identifies a third subfield in any columns. In the table user_profiles, only the "address" data column has a third subfield. Accordingly, the access path "1.1.1.*.3" corresponds to the third subfield "zip" of the "address" data column. The ":" in the examples provided above is a delimiter used in some implementations. In various implementations, other delimiters, e.g., dots, spaces or dashes can be used.

The policy system stores (508) each access path in association with a corresponding rule as access control metadata. The policy system can store the access control metadata in an access permissions table that is keyed on the access path. The policy system can store the access permissions table in an in-memory database to expedite enforcement of the data access policies.

The policy system provides (510) the access control metadata to a policy enforcer, e.g., the policy enforcer 202 of FIG. 2, for enforcing the data access policy on the subfields of the data column. Additional details on enforcing data access policy are described below in reference to FIG. 6.

FIG. 6 is a flowchart of an example method of enforcing data access policies on subfields of a data column. The method 600 can be performed by a policy system including a policy enforcer, e.g., the policy system 102 of FIG. 1.

The policy system can intercept (602) a query submitted by a user device to a database. The query includes a statement for accessing a data column of a table in the database. The statement can include a direct reference to the data column, e.g., SELECT address FROM user_profiles, where the explicit term "address" is the data column being accessed. The statement can include an indirect reference to the data column, e.g., SELECT * FROM user_profiles, where the "*" implicitly references multiple data columns including the "address" data column. The policy system identifies the data column in either case.

The policy system can determine (604) that the data column has a data type that defines a plurality of subfields of the column. For example, the policy system can determine that the "address" column has a data type "address type" as shown in Listing 1, which defines three subfields: street, city, and zip. In various implementations, the subfields can have nested subfields. For example, the subfield "street" can have a data type "street type" than defines second-level subfields "street name," "street number" and "apartment number." Using the access path format described above, these second-level subfields can be represented as 1.1.1.3.1.1, 1.1.1.3.1.2 and 1.1.1.3.1.3.

The policy system can obtain (606), from access control metadata, an access restriction on a subfield of the column. Obtaining the access restriction includes determining an access path representing relationships between the database, a schema of the table, the table, the column and the subfield. Determining the access path can include determining a respective identifier of the database, the schema, the table, the column and the subfield based on terms in the query and a sequence map. For example, the policy system can determine the names of the database, schema, table, column and subfield from the query. The policy system can then perform a lookup for identifiers using the names in a sequence map, e.g., sequence map 306 of FIGS. 3A and 3B. The policy system generates the access path by concatenating the respective sequence identifiers into the access path.

The policy system then obtains the access restriction by performing a lookup in the access control metadata using the access path. The access restriction specifies an effect on an action on a subfield. The effect can include, for example, allow, deny or mask. The action can include, for example, read, write or execute.

In some implementations, obtaining the access restriction on the subfield includes the following operations. The system determines, based on a result of the lookup, that no access restriction is directly applicable to the subfield. In response, the system performs a second lookup using an access path of a parent field of the subfield. The parent field can be a data field that includes the subfield. The system obtains, based on a result of the second look up, the access restriction that is applicable to the parent field. The system then designates the access restriction applicable to the parent field as the access restriction of the subfield The access control metadata is stored in an access permission table that is keyed on access paths. Each access path includes a sequence of identifiers. The sequence, e.g., D:S:T:C:F, represents hierarchical relations between the database, the schema, the table, the data column, and a respective subfield.

The policy system can modify (608) the query, including replacing a reference of the data column in the query with a respective reference to each of the plurality of subfields according to the access restriction. Modifying the query can include expanding a term directly or indirectly referencing the data column into multiple terms referencing the subfields. For example, a term "address" in a query can be expanded into "address.street, address.city, address.zip" as shown above in Listing 3.

Modifying the query can include, upon determining that the effect on a subfield is deny, inserting a constant into the query in place of the subfield. For example, if a policy states that "read" access to the "street" subfield of the "address" data column is to be denied, the policy system can replace a portion of the query "SELECT address FROM . . . " into "SELECT '0', address.city, address.zip" FROM . . . " where the "0" is an example of a constant value in place of the "address.street" subfield.

Modifying the query can include, upon determining that the effect on a subfield is mask, inserting a command into the query in place of the subfield, the command replacing a portion of content of the subfield with a masking string. For example, the policy system can determine that a rule specifies that the last four digits of the "zip" subfield shall be masked by a masking string for security reasons. The policy system can insert a string replacement command, e.g., "regexp_replace" as shown in Listing 3, into the query.

In some implementations, the policy system obtains, from a user function table, a user defined function on a subfield of the column, wherein obtaining the user defined function is based at least in part on comparing the access path with one or more identifiers in the user function table. Modifying the query can include inserting the user defined function into the query in place of the reference of the column. The user-defined functions can be similar to the policies.

For example, through a function definition interface, the policy system can receive a function or procedure to be performed on a subfield. The function, for example, can include capitalizing all content in a subfield, e.g., "street," and removing consecutive spaces from the subfield. The policy system stores the function in the user function table, and injects the function into the query at runtime.

The policy system can submit (610) the modified query to the database. The policy system can retrieve a portion of the data column returned in response to the modified query. The portion of the data column can include masked subfields of the data column access to which is partially permitted under the access restriction. For example, in response to a modified query of Listing 3, for a postal code (e.g., "94063"), the policy system can receive a masked postal code (e.g., "9XXXX"). The policy system can provide the retrieved portion of the data column to the user device as a result of executing the query.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method, comprising:
   intercepting, by a policy system that limits access to a database, a query submitted by a user device to the database, the query including a statement for accessing a data column of a table in the database;
   determining, by the policy system, that the data column has a data type that defines a plurality of sub fields of the data column;
   obtaining, by the policy system from access control metadata, an access restriction on a sub field of the data column;
   modifying the query to provide a modified query that includes a reference to the subfield according to the access restriction; and
   submitting the modified query to the database.

2. The method of claim 1, wherein the access restriction defines an operation to be performed on data of the subfield, and modifying the query comprises inserting, to the query, a reference to the operation.

3. The method of claim 2, wherein the operation comprises masking data of the sub field, and the method further comprises:
   retrieving, by the policy system from the database, a portion of the data column returned in response to the modified query, the portion of the data column comprising a masked form of the sub field that is masked according to the operation; and
   providing, by the policy system, the retrieved portion of the data column to the user device as a result of executing the modified query.

4. The method of claim 1, wherein the subfield is a first subfield and the access restriction is a first access restriction, the method further comprises:
   obtaining, by the policy system from access control metadata, a second access restriction on a second sub field of the data column,
   wherein modifying the query includes replacing a reference of the data column in the query with a first reference to the first subfield according to the first access restriction and a second reference to the second subfield according to the second access restriction.

5. The method of claim 1, wherein the access control metadata is stored in an access permission table that is keyed on access paths, each access path including a sequence of identifiers, the sequence representing hierarchical relations between a respective subfield and one or more of the database, a schema of the database, the table, and the data column.

6. The method of claim 1, wherein the access restriction specifies an effect on an action, the effect including allow, deny or mask, the action including read, write or execute.

7. The method of claim 6, wherein modifying the query comprises, upon determining that the effect on a subfield is deny, inserting a constant into the query in place of the subfield.

8. The method of claim 6, wherein modifying the query comprises, upon determining that the effect on a sub field is mask, inserting a command into the query in place of the sub field, the command replacing a portion of content of the sub field with a masking string.

9. The method of claim 1, comprising:
obtaining, by the policy system, a user defined function to be performed on a second sub field of the data column; and
inserting the user defined function into the query, including referencing the user defined function to the data column in the query.

10. A system, comprising:
one or more processors; and
computer-readable storage device coupled to the one or more processors and having instructions stored thereon which, when executed by the one or more processors, cause the one or more processors to perform operations comprising:
intercepting a query submitted by a user device to a database, the query including a statement for accessing a data column of a table in the database;
determining that the data column has a data type that defines a plurality of sub fields of the data column;
obtaining, from access control metadata, an access restriction on a subfield of the data column;
modifying the query to provide a modified query that includes a reference to the subfield according to the access restriction; and
submitting the modified query to the database.

11. The system of claim 10, wherein the access restriction defines a function to be performed on data of the subfield, and modifying the query comprises inserting, to the query, a reference to the function.

12. The system of claim 11, wherein the function comprises masking data of the subfield, and the operations further comprise:
retrieving, from the database, a portion of the data column returned in response to the modified query, the portion of the data column comprising a masked form of the subfield that is masked according to the operation; and
providing the retrieved portion of the data column to the user device as a result of executing the modified query.

13. The system of claim 10, wherein the access control metadata is stored in an access permission table that is keyed on access paths, each access path including a sequence of identifiers, the sequence representing hierarchical relations between a respective subfield and one or more of the database, a schema of the database, the table, and the data column.

14. The system of claim 10, wherein the access restriction specifies an effect on an action, the effect including allow, deny or mask, the action including read, write or execute.

15. The system of claim 10, wherein the operations further comprise:
obtaining a user defined function to be performed on a second sub field of the data column; and
inserting the user defined function into the query, including referencing the user defined function to the data column in the query.

16. A computer storage medium storing instructions that are operable, when executed by one or more computers, to cause the one or more computers to perform operations comprising:
intercepting a query submitted by a user device to a database, the query including a statement for accessing a data column of a table in the database;
determining that the data column has a data type that defines a plurality of subfields of the data column;
obtaining, from access control metadata, an access restriction on a sub field of the data column;
modifying the query to provide a modified query that includes a reference to the subfield according to the access restriction; and
submitting the modified query to the database.

17. The computer storage medium of claim 16, wherein the access restriction defines an operation to be performed on data of the sub field, and modifying the query comprises inserting, to the query, a reference to the operation.

18. The computer storage medium of claim 16, wherein the access control metadata is stored in an access permission table that is keyed on access paths, each access path including a sequence of identifiers, the sequence representing hierarchical relations between a respective sub field and one or more of the database, a schema of the database, the table, and the data column.

19. The computer storage medium of claim 16, wherein the access restriction specifies an effect on an action, the effect including allow, deny or mask, the action including read, write or execute.

20. The computer storage medium of claim 16, the operations further comprising:
obtaining a user defined function to be performed on a second sub field of the data column; and
inserting the user defined function into the query, including referencing the user defined function to the data column in the query.

* * * * *